Patented Mar. 25, 1952

2,590,075

UNITED STATES PATENT OFFICE 2,590,075

QUINOXALINES AND PROCESS OF MAKING SAME

Jean Druey, Riehen, and Paul Schmidt, Therwil, Switzerland, assignors to Ciba Pharmaceutical Products, Inc., Summit, N. J.

No Drawing. Application April 30, 1951, Serial No. 223,822. In Switzerland May 5, 1950

3 Claims. (Cl. 260—250)

This invention relates in particular to the manufacture of 5:6:7:8:-dipyrido-(5':6':2'':3'')- and 5:6:7:8:-dipyrido-(5':6':5'':6'')-quinoxalines with the nuclei of the formulae

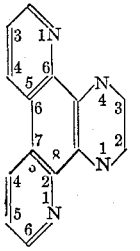 and 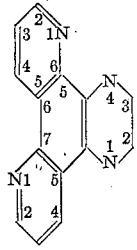

especially of dipyridoquinoxalines the diheteroatomic ring of which is dihydrogenated or tetrahydrogenated, and salts thereof. The said compounds can be substituted, especially by alkyl residues or aryl residues, both in the quinoxaline ring and in the two pyridine rings.

The new compounds are obtained by reacting a 4:7- or 1:7-phenanthroline carrying in each of the 5- and 6-positions a substituent replaceable by an amino group with a diprimary aliphatic diamine, the amino groups of which are linked to adjacent carbon atoms.

The principal starting materials are 4:7- or 1:7-phenanthrolines which in the 5- and 6-positions carry a hydroxy or oxo group or a reactive nitrogenous functional derivative thereof, such as an imine, primarily the 5:6-dihydroxy-1:7- and -4:7-phenanthroline, and 1:7- and 4:7-phenanthroline-5:6-quinone. These phenanthrolines are advantageously caused to react with ethylene-1:2-diamine or, furthermore, e. g. the following aliphatic diamines: 1:2-diamino-propane, 1:2-diamino-butane, 2:3-diamino-butane, or 1-phenyl-ethylene-1:2-diamine. Alternatively, these diamines may be produced in the course of the reaction, that is to say, in lieu of the diamines mentioned there may be used their N-derivatives which in the course of the reaction are capable of reacting as free diamines or to react in the same manner as free diamines, for example, ethylene urea. The said diamines may also be reacted in the form of their mono-salts or di-salts.

The phenanthroline-5:6-quinones to be used as starting materials for the instant process can be obtained by oxidizing phenanthrolines containing in the 5- or 6-position a free or substituted hydroxy or amino group with nitric acid, for example, at a temperature of 120° C. in the presence of sulfuric acid. From these quinones, the 5:6-dioxy compounds can be obtained with the aid of reducing agents, such as hydrogen in the presence of a nickel catalyst.

When compounds of the type of the dihydroxyphenanthrolines are reacted according to the present invention, tetrahydroquinoxalines are obtained. On the other hand, in the reaction with phenanthroline-quinones, tetrahydroquinoxalines and quinoxalines can be isolated, these two kinds of compounds probably being formed by disproportionation from the expected dihydroquinoxalines. Under certain conditions, the latter can also be isolated.

The reaction can be conducted in the presence or absence of organic or inorganic diluents, such as alcohols, ketones, hydrocarbons, esters, acids, or water, at room temperature or at a raised temperature, in an open vessel or under pressure. Depending on the reaction conditions, catalysts or condensing agents can also be employed. In the reaction with the quinones the simultaneous use of reducing agents may in some cases be of advantage. It is also possible to remove by the usual physical means the water formed during the reaction.

Depending on the procedure followed, the new quinoxalines are obtained in the form of bases or salts. From the bases, it is possible to prepare, for example the following salts of the said quinoxalines starting from the corresponding acid: the hydrochloride, sulfate, nitrate, phosphate, thiocyanate, acetate, propionate, oxalate, malonate, citrate, benzoate, methane-sulfonate, ethane-sulfonate, oxyethane-sulfonate, benzene-sulfonate or toluene-sulfonate.

The new quinoxalines obtained according to the present process have valuable therapeutic properties. In particular, they have carcinolytic properties, and also antiparasitic properties. They can be used as medicaments or as intermediary products. Particularly useful are the dipyridoquinoxalines formed in the reaction of 4:7- or 1:7-phenanthroline-5:6-quinone with ethylene-1:2-diamine.

The following examples illustrate the invention, the parts being by weight unless otherwise stated and the relationship of parts by weight to parts by volume being the same as that of the gram to the cubic centimetre:

Example 1

20 parts of 4:7-phenanthroline-5:6-quinone are dissolved in 1000 parts by volume of methanol and mixed with 6 parts of ethylene diamine. The reaction sets in immediately, most likely initially forming 5:6:7:8 - dipyrido - (5':6':2'':3'') - dihydro-quinoxaline of the formula

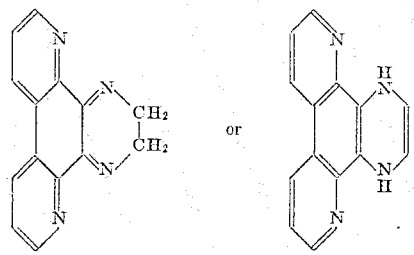

The whole is then evaporated and the residue recrystallised from methanol to obtain two products. One is 5:6:7:8-dipyrido-(5':6':2'':3'')-quinoxaline of the formula

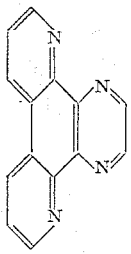

It is best further recrystallised from methanol and melts at 270° C. The other product is 5:6:7:8 - dipyrido - (5':6':2'':3'') - 1:2:3:4-tetrahydro-quinoxaline of the formula

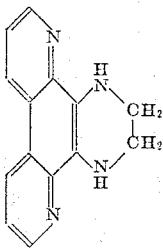

It dissolves well in ethyl acetate and benzene, forms salts such as for example the hydrochloride, sulfate or methane sulfonate, and melts at 187° C.

Instead of using ethylene diamine, the reaction can be brought about in the same manner as indicated above with other ethylene diamines, such as for example 1:2-diaminopropane, yielding 5:6:7:8 - dipyrido - (5':6':2'':3'') - quinoxalines, substituted in the positions 2 and/or 3.

The 4:7-phenanthroline-5:6-quinone used as starting material can be obtained as follows:

2 parts of 6-methoxy-4:7-phenanthroline are mixed with 10 parts by volume of concentrated sulfuric acid and, while cooling with a mixture of ice and sodium chloride, with 6 parts by volume of fuming nitric acid (density=1.51), and the whole is heated for 2 hours at 120° C. The reaction solution is poured on to ice, its pH value is adjusted to 7 by means of a 10 N-solution of caustic soda, after standing for 2 hours the whole is filtered with suction to remove the precipitate which separates, and the latter is washed with hot water. After recrystallising the product from methyl alcohol and drying it at 100° C. under 0.1 mm. pressure, there are obtained 1.8 parts (i. e. 90 percent of the calculated yield) of 4:7-phenanthroline-5:6-quinone in the form of pale yellow crystals melting at 295° C.

*Example 2*

5 parts of 1:7-phenanthroline-5:6-quinone are dissolved in 300 parts by volume of absolute ethanol and heated with 1.5 parts of ethylene diamine. The reaction sets in immediately with a change in colour of the mixture, most likely initially forming 5:6:7:8-dipyrido-(5':6':5'':6'')-dihydro-quinoxaline of the formula

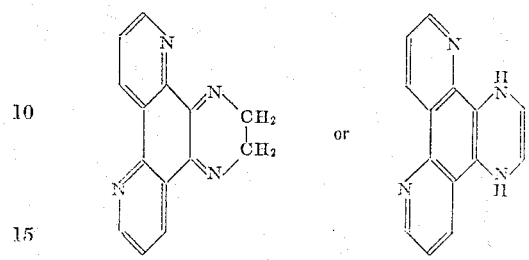

The whole is concentrated by evaporation to 80 parts by volume. The precipitated 5:6:7:8-dipyrido - (5':6':5'':6'') - quinoxaline melts at 302–303° C. after recrystallisation from methanol. It has the formula

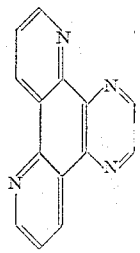

By further concentrating the mother liquor there can be obtained 5:6:7:8 - dipyrido-(5':6':5'':6'')-1:2:3:4-tetrahydroquinoxaline of the formula

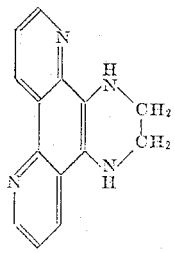

It melts at 171° C.

The 1:7-phenanthroline-5:6-quinone used as starting material can be obtained as follows:

5 parts of 6-hydroxy-1:7-phenanthroline are mixed with 25 parts by volume of concentrated sulfuric acid and, while cooling, with 15 parts by volume of fuming nitric acid (density=1.51), and the whole is heated for 2 hours at 120° C. The whole is then poured into 250 parts by volume of water and adjusted by means of a 10 N-solution of caustic soda to a pH value of 7. After a few hours the precipitate is separated by filtering with suction, washed with warm water and recrystallised from methanol. There are thus obtained 4.5 parts (i. e. 90 per cent of the calculated yield) of 1:7-phenanthroline-5:6-quinone in the form of pale yellowish crystals melting at 255° C.

*Example 3*

A suspension of 3 parts of 5:6-dihydroxy-4:7-phenanthroline in 250 parts by volume of boiling methanol is mixed with a solution of 1.5 parts of ethylene diamine in 10 parts by volume of methanol. To complete the reaction, the mixture is heated to 70° C. for about another quarter of an hour. It is then concentrated under reduced pressure to 50 parts by volume. Upon cooling, the 5:6:7:8 - dipyrido - (5':6':2'':3'') - 1:2:3:4-tetrahydroquinoxaline described in Example 1 precipitates in the form of reddish crystals. When recrystallised from a small quantity of benzene it melts at 187° C.

The 5:6-dihydroxy-4:7-phenanthroline used as starting material can be prepared as follows:

1 part of 4:7-phenanthroline-5:6-quinone is dissolved in 100 parts by volume of methanol and hydrogenated at room temperature with addition of 1 part of a nickel catalyst. 90 parts by volume of hydrogen are combined. The solution is then heated to the boiling temperature, and, after the removal of the catalyst by suction-filtering, concentrated by evaporation to 20 parts by volume. On cooling, the 5:6-dihydroxy-4:7-phenanthroline precipitates in the form of lamellae having a silvery lustre and melting at 240° C.

*Example 4*

30 parts of 1:7-phenanthroline-5:6-quinone are dissolved in 1000 parts of methanol with the application of heat and mixed with 15 parts of ethylene diamine. The reaction sets in immediately with a change in colour of the mixture. The whole is concentrated by evaporation to 400 parts by volume, whereby the 5:6:7:8-dipyrido-(5':6':5'':6'') - 1:2:3:4 - tetrahydroquinoxaline described in Example 2 is precipitated in the form of yellow crystals which, after recrystallisation from benzene, melt at 171° C.

By further evaporation of the methanol solution it is possible to obtain the 5:6:7:8-dipyrido-(5':6':5'':6'')-quinoxaline. It crystallises best from a small quantity of methanol. Its melting point is at 302-303° C.

What is claimed is:

1. A process for the manufacture of new quinoxalines, which comprises reacting a member of the group consisting of 4:7- and 1:7-phenanthrolines carrying in each of the positions 5 and 6 a substituent replaceable by an amino group with a diprimary aliphatic diamine, the amino groups of which are linked to adjacent carbon atoms.

2. A process for the manufacture of new quinoxalines, which comprises reacting 5:6-dihydroxy - 4:7 - phenanthroline with ethylene-1:2-diamine.

3. A process for the manufacture of a new quinoxaline, which comprises reacting 5:6-dihydroxy - 1:7 - phenanthroline with ethylene-1:2-diamine.

4. A process for the manufacture of new quinoxalines, which comprises reacting 4:7-phenanthroline-5:6-quinone with ethylene-1:2-diamine.

5. A process for the manufacture of new quinoxalines, which comprises reacting 1:7-phenanthroline-5:6-quinone with ethylene-1:2-diamine.

6. A member of the group consisting of 5:6:7:8-dipyrido-(5':6':2'':3'') - and 5:6:7:8-dipyrido-(5':6':5'':6'')-quinoxalines with the nuclei of the formulae

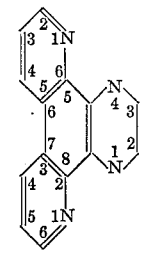 and 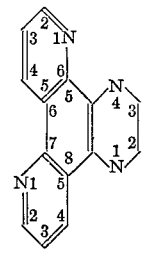

and salts thereof.

7. 5:6:7:8 - dipyrido - (5':6':2'':3'')-dihydroquinoxaline.

8. 5:6:7:8 - dipyrido - (5':6':2'':3'')-1:2:3:4-tetra-hydroquinoxaline.

JEAN DRUEY.
PAUL SCHMIDT.

No references cited.